(12) United States Patent  
Sandidge

(10) Patent No.: US 9,332,248 B1  
(45) Date of Patent: May 3, 2016

(54) SPHERICAL TELEVISION SYSTEM

(71) Applicant: Harlan Sandidge, Fort Worth, TX (US)

(72) Inventor: Harlan Sandidge, Fort Worth, TX (US)

( * ) Notice: Subject to any disclaimer, the term of this patent is extended or adjusted under 35 U.S.C. 154(b) by 144 days.

(21) Appl. No.: 14/257,522

(22) Filed: Apr. 21, 2014

Related U.S. Application Data

(63) Continuation-in-part of application No. 13/162,785, filed on Aug. 3, 2011, now abandoned.

(51) Int. Cl.  
*H04N 13/04* (2006.01)  
*H04N 5/64* (2006.01)

(52) U.S. Cl.  
CPC . *H04N 13/04* (2013.01); *H04N 5/64* (2013.01)

(58) Field of Classification Search  
CPC ... H04N 7/181; H04N 13/13; H04N 13/0055; H04N 13/0497  
USPC ............................................. 348/36–41, 840  
See application file for complete search history.

(56) References Cited

U.S. PATENT DOCUMENTS

| | | | | |
|---|---|---|---|---|
| 1,933,866 A * | 11/1933 | Mattman | ................. | G09F 13/04 362/360 |
| 4,107,764 A * | 8/1978 | Riley | ..................... | F21S 4/001 362/35 |
| 5,130,794 A * | 7/1992 | Ritchey | .................... | F41G 7/30 348/383 |
| 6,176,584 B1 * | 1/2001 | Best | ....................... | G03B 21/00 353/30 |
| 2005/0128286 A1 * | 6/2005 | Richards | ............ | G06F 3/04815 348/36 |
| 2010/0220895 A1 * | 9/2010 | Koren | .................... | G01V 1/345 382/109 |

* cited by examiner

*Primary Examiner* — Andy Rao  
(74) *Attorney, Agent, or Firm* — James E. Walton; Damon R. Hickman

(57) ABSTRACT

A spherical television system for displaying imagery on a sphere. The spherical television includes layered displays or a rotating disc display along with a coordinate system to allow the spherical television system to measure ambient light through light tubes and playback spherical imagery.

13 Claims, 22 Drawing Sheets

SPHERICAL TELEVISION SYSTEM

This application claims the benefit and is a continuation-in-part of U.S. patent application Ser. No. 13/162,785 filed 3 Aug. 2011, titled "SPHERICAL TELEVISION SYSTEM," which is hereby incorporated by reference for all purposes as if fully set forth herein.

BACKGROUND

1. Field of the Invention

The present invention is directed to the field of televisions that are spherical in shape and capable of displaying an image with a third dimensional depth into the spherical shaped television. The present invention is also directed to the field of video sensors that are spherical in shape and capable of sensing an image with a third dimensional depth.

2. Description of Related Art

Current state of the art is such that there are several known systems for producing three dimensional televisions. Typically those systems utilize two distinct images to create a simulated depth with use of blue and red filtered lens to trick the eyes of the viewer. Furthermore, there are systems where multiple displays are adjoined together to provide the viewer with a more immersive view. Example of the multiple displays include flight simulators that have two or three displays abutted together to provide the simulator with a wider perspective than a single display. Those systems are however limited in that they have an edge of the display and are not totally immersive. The current systems allow users to change positions relative to the display and see the image from a different angle. However those systems do not allow the user to change positions relative to the display and obtain a different perspective. While there are many systems for displaying and sensing video images well known in the art, considerable room for improvement remains.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
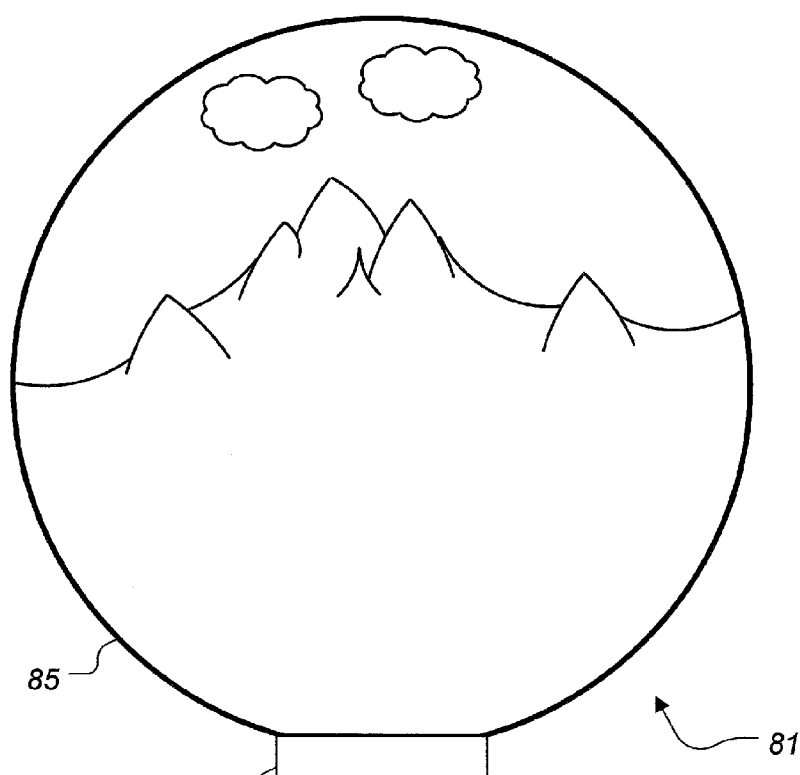
FIG. 1a is an oblique view of a preferred embodiment of a spherical television according to the present application.

While the systems and methods of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application.

DETAILED DESCRIPTION OF THE PREFERRED EMBODIMENT

Illustrative embodiments of the system for spherical televisions are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1a in the drawings, an oblique view of a preferred embodiment of a spherical television according to the present application is illustrated. Spherical television 81 is configured for displaying images across a majority of a sphere shaped display 85. Spherical television 81 includes a base member 89 to support the sphere shaped display 85. Spherical television is able to view the environment, the solar system, as far as infinity and produces an image that the user can change their perspective against by moving relative to the spherical television. Depending on the distance covered, the focus on the spherical television will be on, for example the mountains, an object surrounded by the atmospheric conditions surrounding the mountains, such as the clouds. Using a system either looking outwardly or inwardly to create a solid-appearing display of objects of all kinds of large to small sized. Objects from solar systems to toys can be imaged and displayed by this system.

The spherical television includes sensors for measuring the lights outside the sphere. Typically the sensors are located inside the sphere looking outwards; however the sensors could be a distance outside the sphere looking inwardly. Furthermore, in one embodiment the sphere contains sensors and displays inside the sphere. In an alternative embodiment the sensors are in a first sphere and the displays are in a second sphere. The first sphere and the second sphere are in electrical communications with each other so that information from the first sphere is displayed on the second sphere.

Figure 1B:
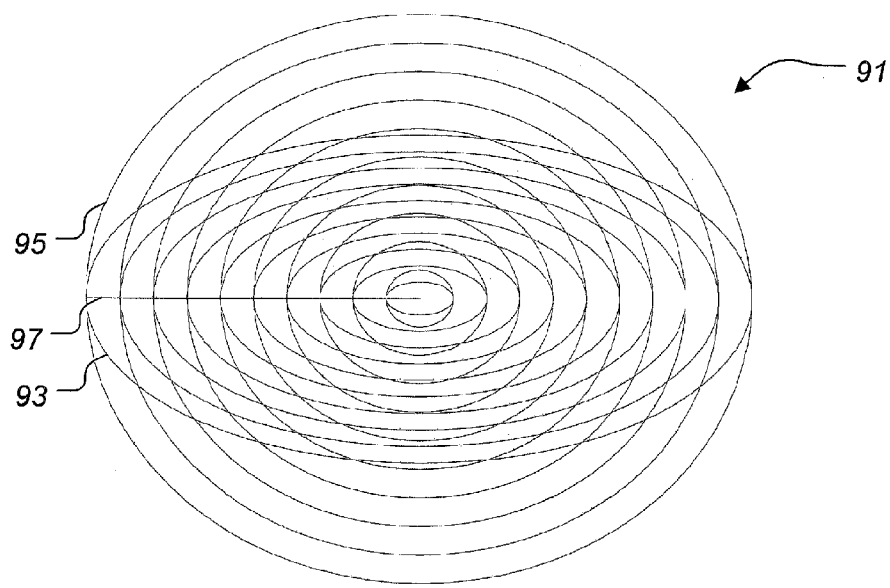
FIG. 1b is an isometric view of a coordinate system for a spherical television system according to the present application.

Referring now also to FIG. 1b in the drawings, an isometric view of a coordinate system for a spherical television system according to the present application is illustrated. An integral feature of a spherical television, such as spherical television 81 is a coordinate system 91. The spherical television system must be able to keep track of the colors and positions of the colors it senses and the coordinate system 91 facilitates the positional data of the colors. Coordinate system 91 includes an X coordinate 93, a Y coordinate 95, and a Z coordinate 97. The X coordinate 93 is referenced to the horizontal rotation. The Y coordinate 95 is referenced to the vertical rotation. The Z coordinate 97 is referenced to the center of the sphere. The X and Y coordinates are instrumental in determining the Z coordinates, which can be used to construct contour lines and surfaces which can display three-dimensionally within the spherical space. The Z coordinate is created from the Y plus the laser distancing from the center of the sphere. The light qualities and color are also inherent in this sensing or reading of the specific Z coordinate. Each equivalent pixel of light can be defined by the Z coordinate plus the X coordinate plus the Y coordinate and measured by the three color sensors plus the modulated intensity of the light.

Figure 2:
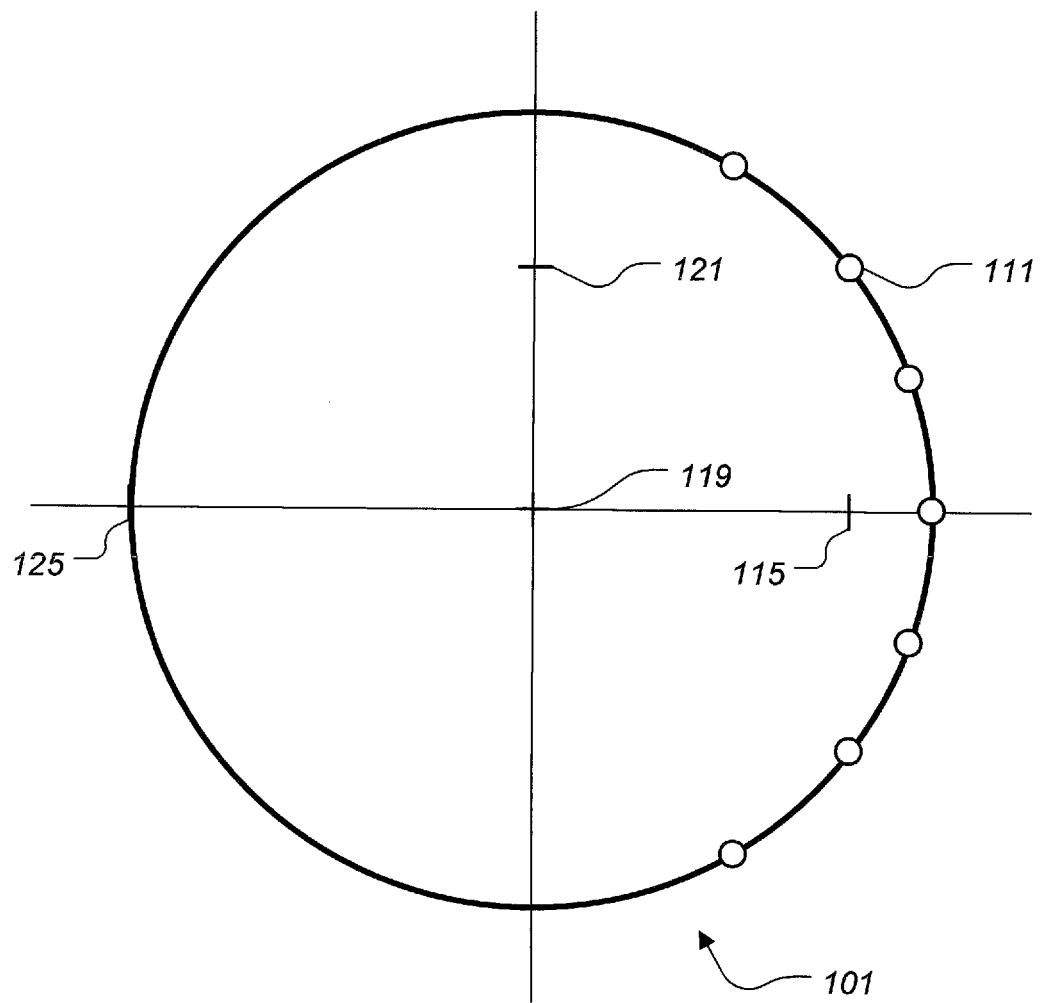
FIG. 2 is a plan view of a section of the spherical television according to the present application.

Referring now also to FIG. 2 in the drawings, a plan view of a section of the spherical television according to the present application is illustrated. Spherical display 85 is comprised of a plurality of sections or plane. Section 101 is comprised of a series of display elements such as display element 111 arranged around the circumference of section 101. Display element 111 preferably includes a plurality of light emitting diodes (LED's) for reproducing a wide spectrum of colors when directed. While only seven display elements are illustrated, it should be apparent that the plurality of display elements are positioned around the circumference of section 101 in order to cover the section.

Display element 111 has a horizontal component 115 relative to a center of the section 119. Display element 111 also has a vertical component 121 relative to the center of the section 119. Each and every display element located on section 101 has a different set of horizontal and vertical components relative the center 119 depending upon the position of the display elements. Display element 111 also has a layer component or Z component 125 relative to the center of the section 119. Each and every display element located on section 101 has the same layer component relative the center 119, because all the display elements are located on the same layer.

Figure 3:
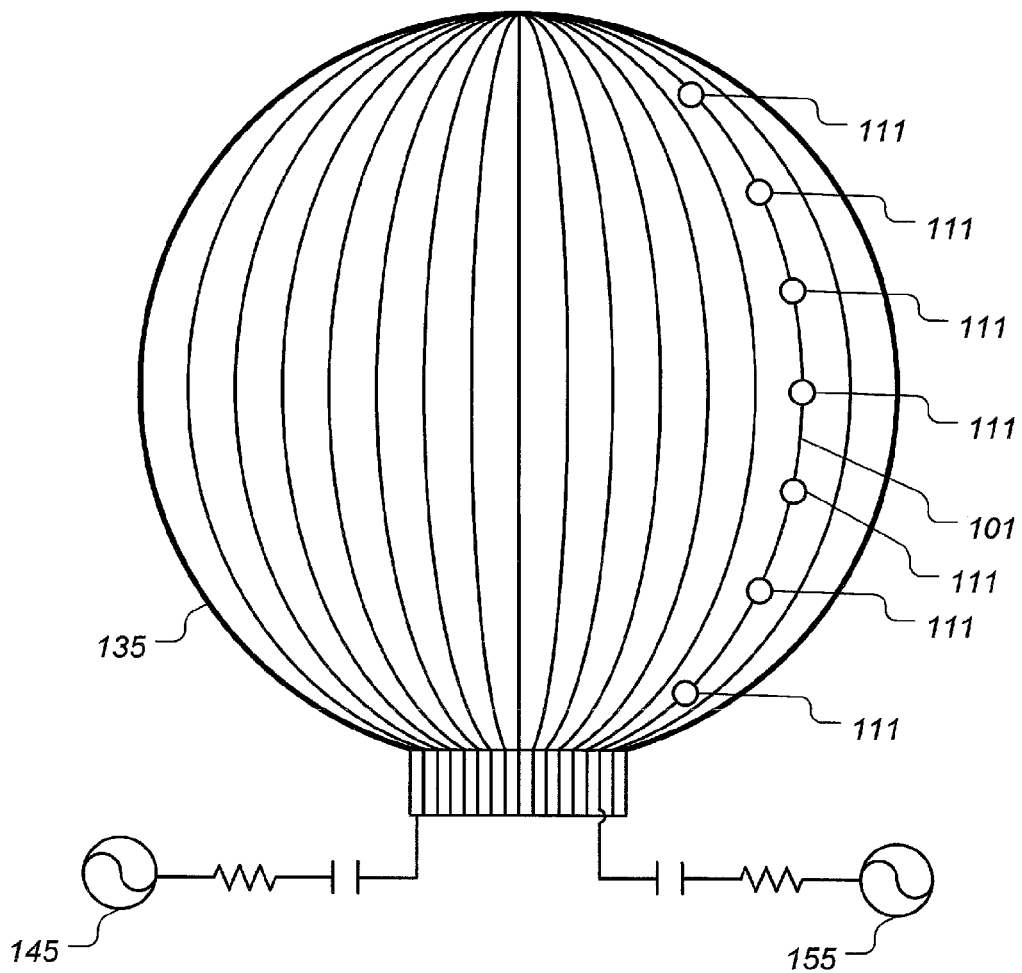
FIG. 3 is an oblique view of a layer of the spherical television according to the present application.

Referring now also to FIG. 3 in the drawings, an oblique view of a layer of the spherical television according to the present application is illustrated. Layer 135 is comprised of a plurality of sections, such as section 101, arranged to form a sphere. Each of the sections is clocked at a different angle. Except for the display elements located on layer 135, the layer is transparent such that light can pass through the layer 135.

The system includes a vertical scanning/sequencing mechanism 145 and a horizontal scanning/sequencing mechanism 155. As the system sequential switches in the X axis, of the vertical sections, the display of images produces apparent motion along the horizontal axis. Furthermore, as the vertical display elements, such as display elements 111, along a section are sequenced the image produces apparent motion along the vertical axis.

Figure 4:
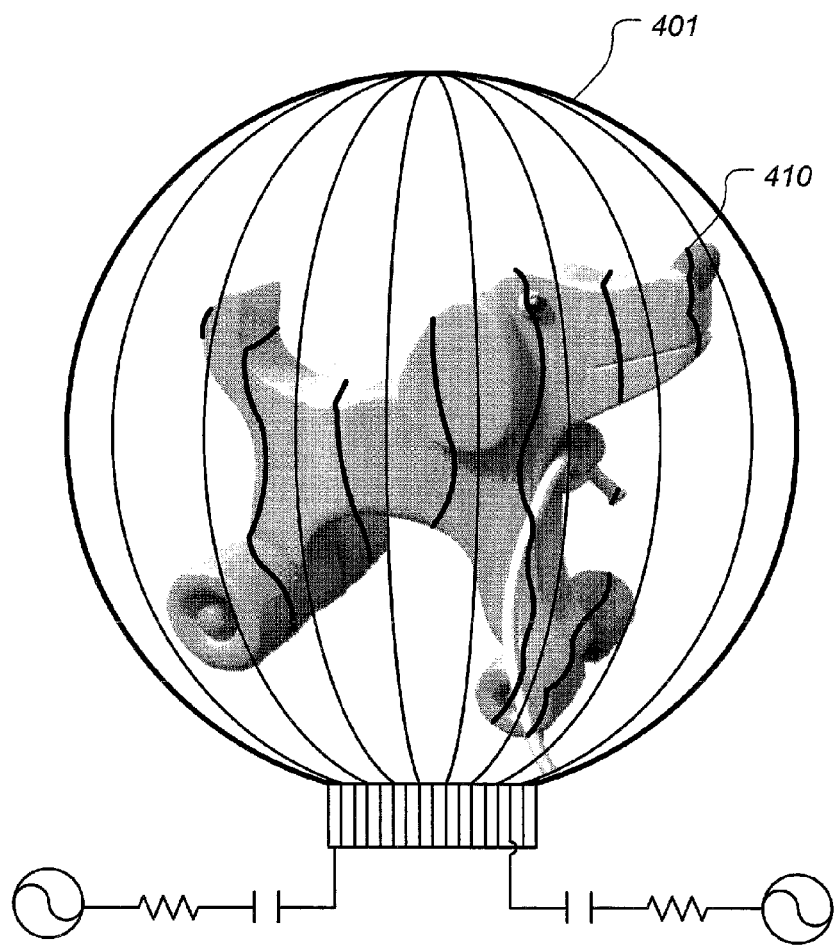
FIG. 4 is an oblique view of a spherical television according to the present application.

Referring now also to FIG. 4 in the drawings, an oblique view of a spherical television according to the present application is illustrated. Spherical television 401 is displaying an image of a dog shaped toy. The spherical television 401 generates contours 410 for each of the sections. The sections are circularly aligned on a flat plate or disk shaped format. The spacing of the sections should be the width of a pixel of the image. The spacing as shown in FIG. 4 is exaggerated for illustration purposes. It should be apparent that the more sections and the narrower the sections increases the resolution of the spherical television 401.

Figure 5:
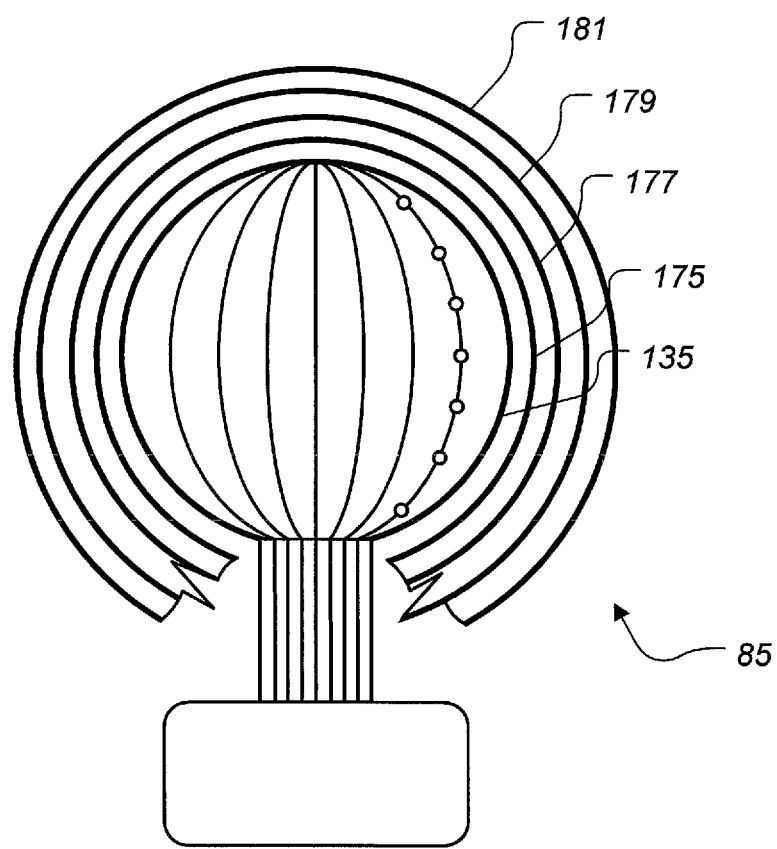
FIG. 5 is an oblique view of the spherical television with a portion removed according to the present application.

Referring now also to FIG. 5 in the drawings, an oblique view of the spherical television with a portion removed according to the present application is illustrated. Spherical television 85 is comprised of a plurality of layers, such as layer 135, much like an onion. As illustrated, portions of layers 175, 177, 179, and 181 were removed so that layer 135 is visible. Layers 175, 177, and 179 are identical to layers 135. Because of the transparent nature of layers 135, 175, 177, 179, and 181 a dimensional depth can be created by the spherical television 85 by illuminating a layer such as 175 and allowing the light to pass through layer 177, 179, and 181.

Layer 181 includes a plurality of imaging sensors located proximate the plurality of display elements located on layer 181. The plurality of imaging sensors are focused outwardly from the outer most surface of the spherical television 85 and provide a video source for the spherical television 85. In an alternative embodiment tubes or polarizing filters are used in conjunction with the plurality of imaging sensors to improve image quality. Preferably the polarizing filters would be the outer most surface of the sphere.

Figure 6:
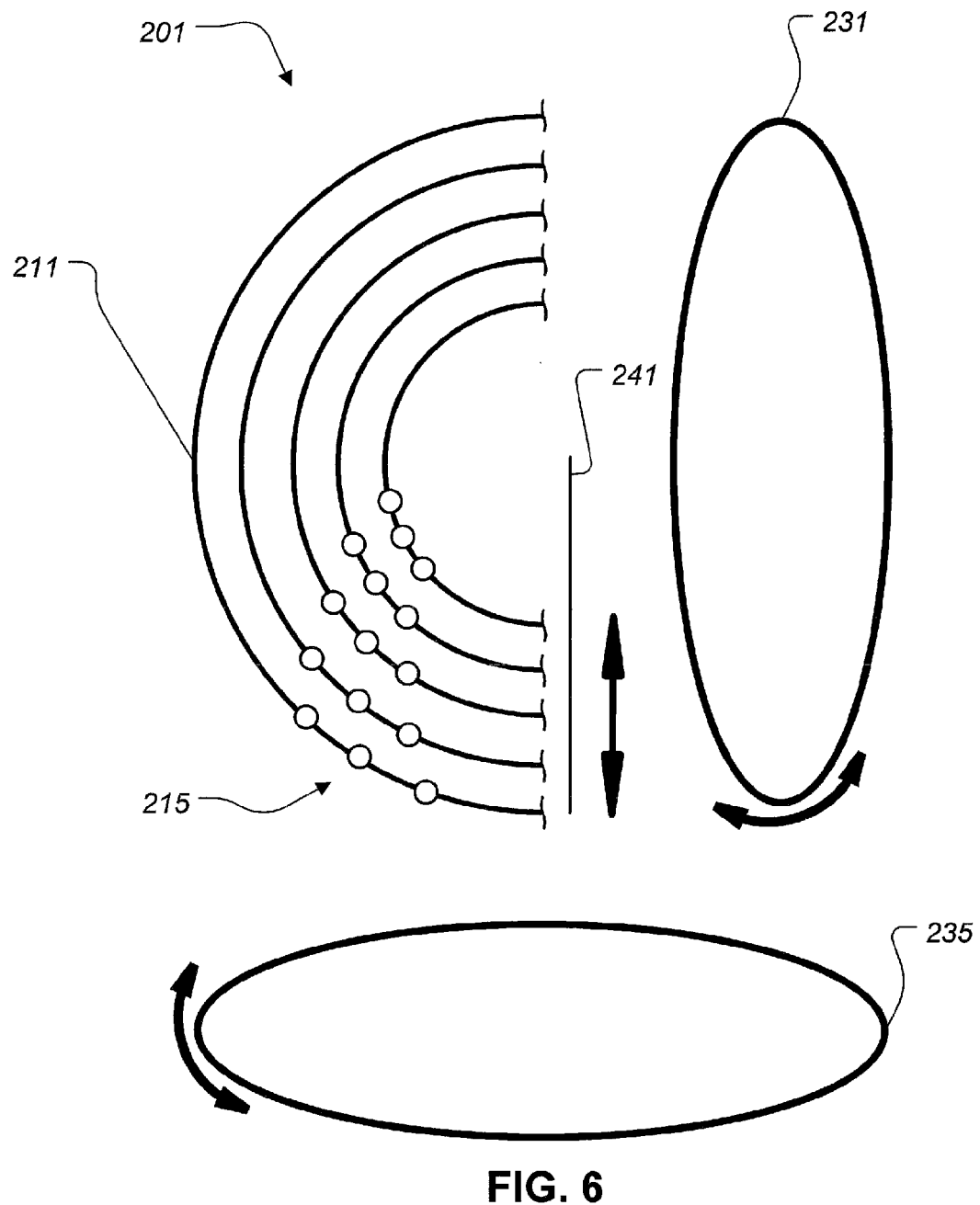
FIG. 6 is a schematic of a sequential action system according to the present application.

Referring now also to FIG. 6 in the drawings, a schematic of a sequential action system according to the present application is illustrated. System 201 includes a series of translucent spheres nested to form a single sphere 211. Each of the spheres contain a series of display elements 215 that are individual controllable to display colored light and are able to display images when controlled together. Display elements 215 are preferably LED's.

Controller 225, sequences the series of display elements 215 in a "Y" direction 231, in a "X" direction 235, and in a "Z" direction 241.

Figure 7:
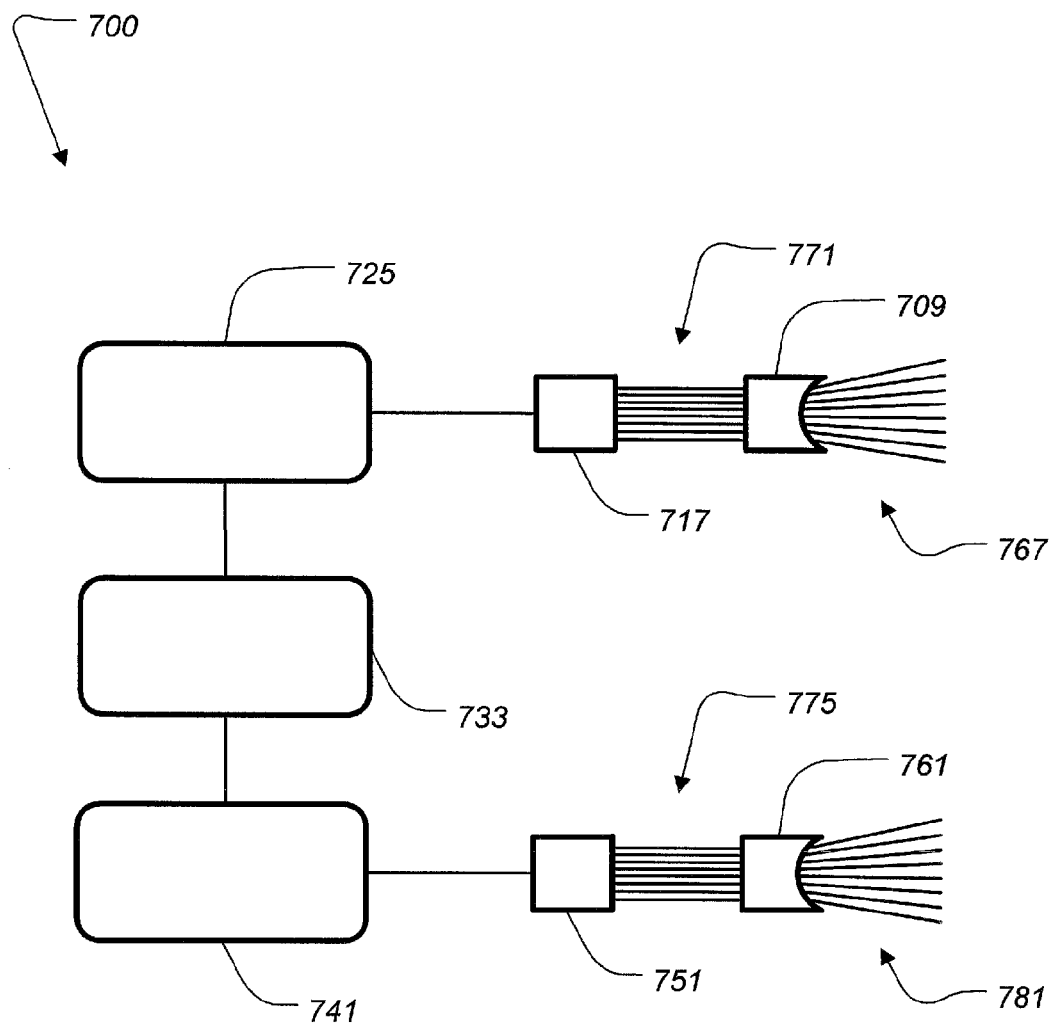
FIG. 7 is a schematic of a sensor and playback system according to the present application.

Referring now also to FIG. 7 in the drawings, a schematic of a sensor and playback system according to the present application is illustrated. Sensor and playback system 700 includes an input convex lens 709, a digital recorder 717, digital storage 725, an amplifier 733, a digital display 741, a digital playback 751, and an output convex lens 761.

The input convex lens 709 receives the outside image in sections and takes the input divergent rays 767 and converts them to input parallel rays 771 to be recorded by the digital recorder 717. The digital storage 725 stores the digital information from the digital recorder 717. Amplifier 733 amplifies the information from the digital recorder 717 and for display from the digital display 741. The digital display in conjunction with the digital playback 751 generates output parallel rays 775. The output convex lens 761 converts the output parallel rays 775 into output divergent rays 781. Preferably the output divergent rays are directed to the eyes of the users, or alternately to LED's on the interior surface of the sphere.

Figure 8:
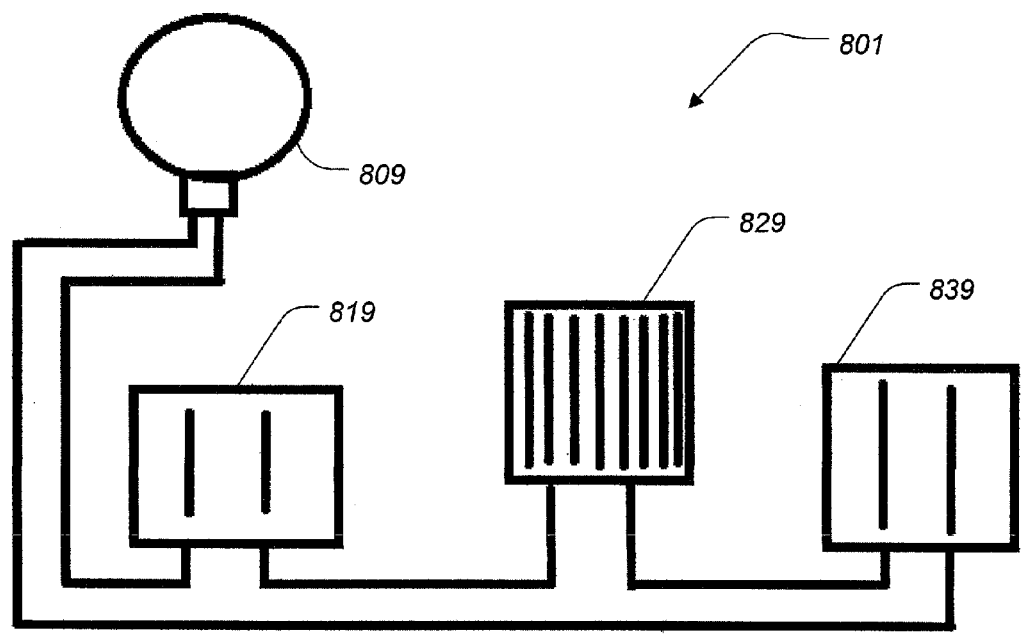
FIG. 8 is a schematic of a spherical television and playback system according to the present application.

Referring now also to FIG. 8 in the drawings, a schematic of a spherical television and playback system according to the present application is illustrated. System 801 is comprised of a spherical television 809, a flat to circular interface 819, an audio recorder 829, and a video recorder 839. Spherical television 809 displays and produces the various video and audio feeds from the audio recorder 829, and the video recorder 839. The flat to circular interface 819 processes the two dimensional video from the video recorder 839 and converts the two dimensional video into a circular format suitable for the spherical television 809. Spherical television 809 includes a plurality of speakers in the display, to playback the audio from the audio recorder 829. System 801 allows users to be able to enjoy their spherical television with programming from a conventional television system.

Figure 9:
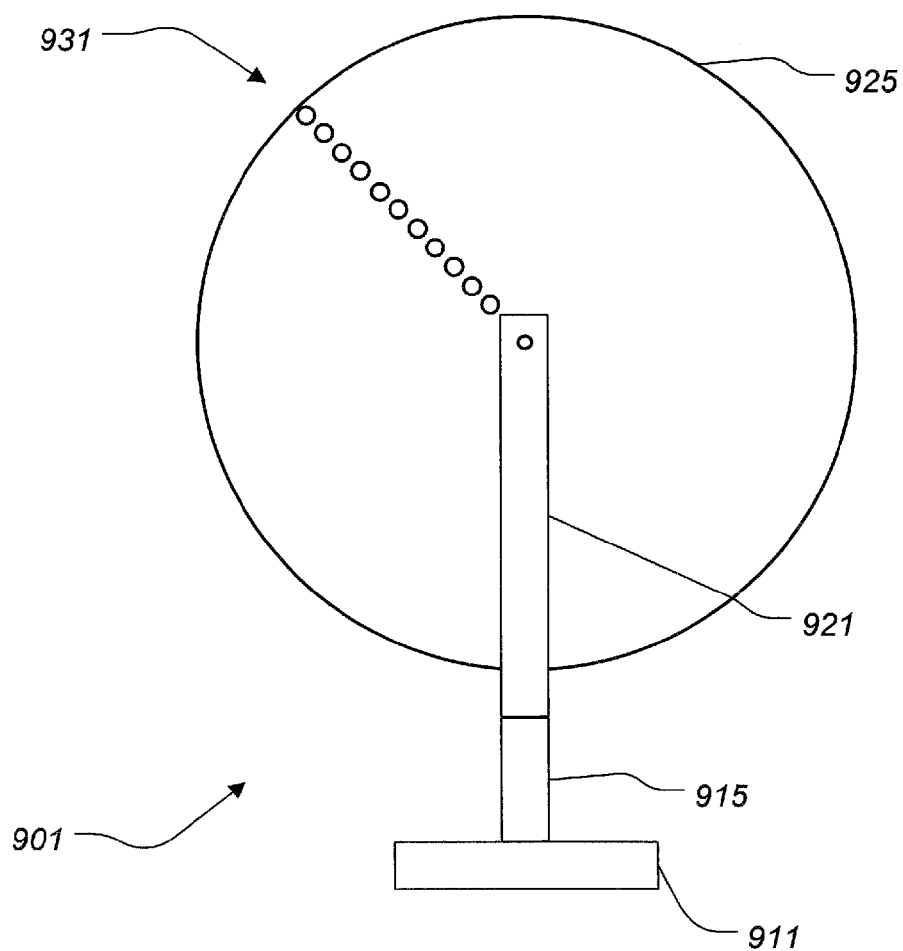
FIG. 9 is an isometric view of an alternative embodiment of a disc based spherical television system according to the present application.

Referring now also to FIG. 9 in the drawings, an isometric view of an alternative embodiment of a spherical television system according to the present application is illustrated. Disk based system 901 includes a base 911, an horizontally rotating stage 915, a disc holder 921, a disc 925, and a plurality of display elements 931 located in a linear pattern on the disc 925. Horizontally rotating stage 915 is rotationally coupled to the disc holder 921 by a motor, located inside the horizontally rotating stage 915, for spinning the disc holder 921 relative to the base 911. Disc holder 921 includes a motor for spinning the disc 925 relative to the disc holder 921. The plurality of display elements 931 includes a linear array of light producing objects, for example light emitting diodes. It should be apparent that the spacing in the illustration of the plurality of display elements 931 was done so that each element was visible in the illustration. Typically, each of the plurality of display elements 931 is tightly packed to form a continuous line. The spinning and rotating disc 925 produces a spherical visual image as each of the plurality of display elements 931 are illuminated.

Figure 10A:
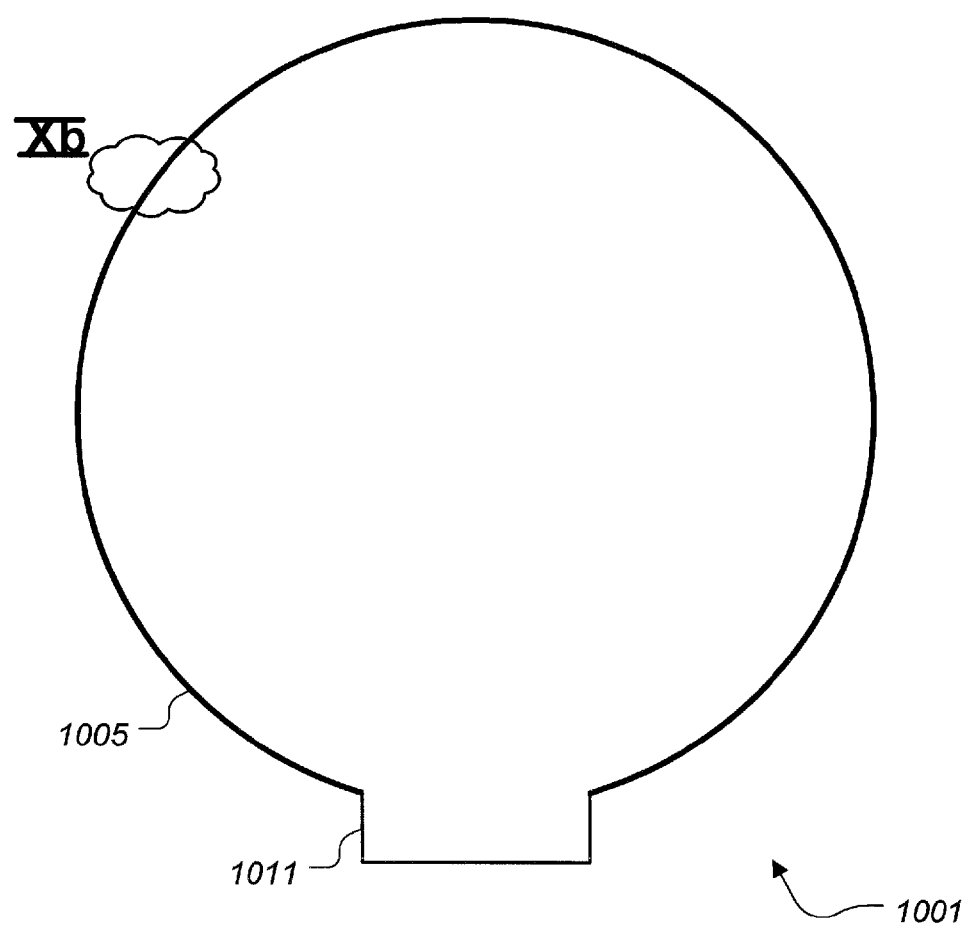
FIG. 10a is a sectional view of an alternative embodiment of a spherical television system according to the present application.

Referring now also to FIG. 10a in the drawings, a sectional view of an alternative embodiment of a spherical television system according to the present application is illustrated. Spherical television system 1001 includes a sphere 1005 having a base portion 1011 for supporting the sphere 1005. Imbedded in the surface of the sphere 1005 are a plurality of light sensing transistors designed to measure the amount of light absorbed through a series of light tunnels.

Figure 10B:
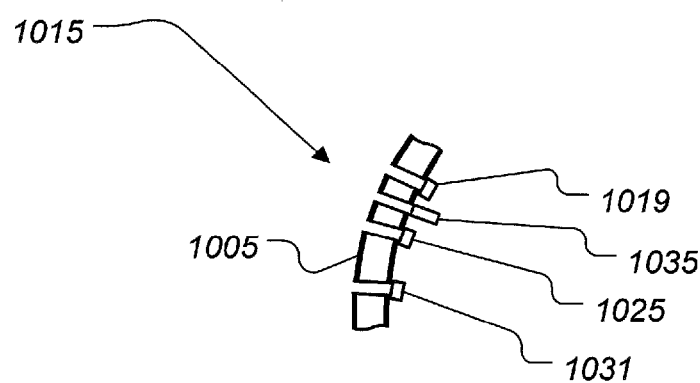
FIG. 10b is a close-up sectional view of an alternative embodiment from FIG. 10a of a spherical television system according to the present application.

Referring now also to FIG. 10b in the drawings, a close-up sectional view of an alternative embodiment from FIG. 10a of a spherical television system according to the present application is illustrated. The plurality of light sensing transistors includes grouping of light tubes 1015. Each group of light tubes 1015 is the equivalent to a pixel of the image. While only one grouping has been shown, it should be apparent that the sphere is covered in sufficient quantity of groupings of light tubes to image a sharp rendition of the space around the sphere 1005. The group of light tubes 1015 includes a red light tube 1019, a green light tube 1025, and a blue light tube 1031. Additionally located proximate to each group of light tubes 1015 is a laser sensor 1035 pointed outwards. Laser sensor 1035 measures the distance from the sphere 1005 to the object being imaged.

Figure 11:
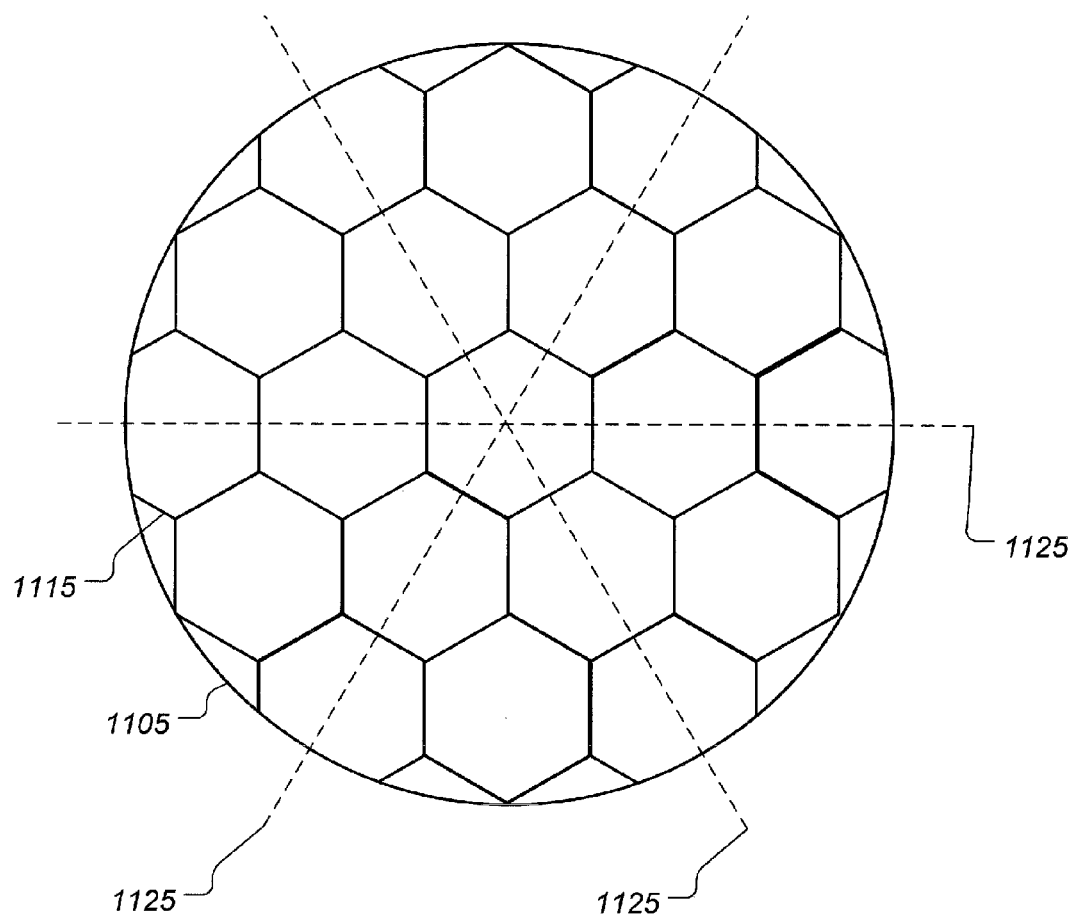
FIG. 11 is a plan view of an alternative embodiment of a spherical television system according to the present application.

Referring now also to FIG. 11 in the drawings, a plan view of an alternative embodiment of a spherical television system according to the present application is illustrated. Spherical television system 1105 includes a plurality of hexagon shaped displays 1115 and or web cameras. Using hexagon shaped displays facilitates covering the entire sphere without overlap and minimizes the gaps between displays 1115. In the preferred embodiment the web cameras are multiplexed to the displays 1115 from one unit to another. For example, one sphere would be of web cameras and another sphere of displays, where the displays were of the output of the corresponding web cameras. Alternatively, there is but a single camera and then converted to be displayed on multiple displays 1115. The centerlines 1125 of sections are like section 101 where the series of displays 1115 are aligned and can be sequentially controlled.

Figure 12:
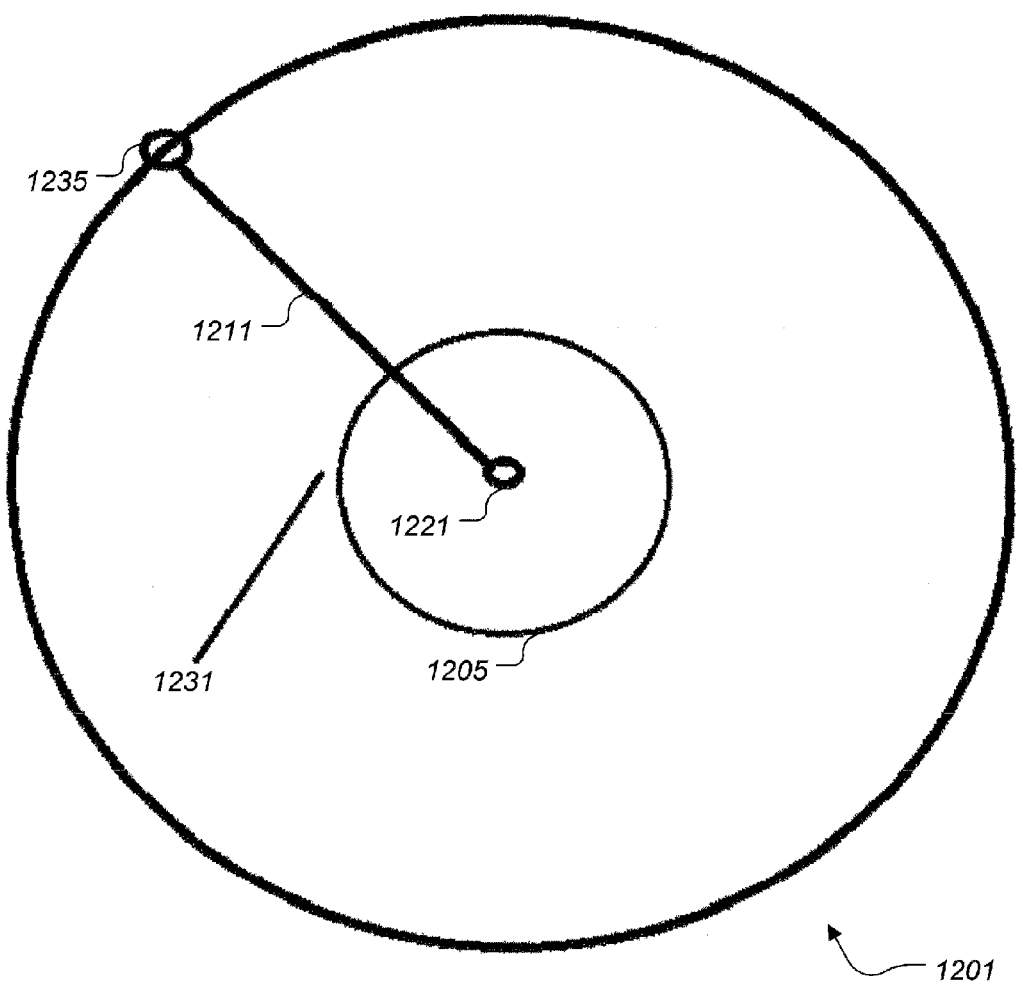
FIG. 12 is a sectional view of an alternative embodiment of a spherical television system according to the present application.

Referring now also to FIG. 12 in the drawings, a sectional view of an alternative embodiment of a spherical television system according to the present application is illustrated. Spherical television 1201 is a phosphorous gas display. Spherical television 1201 includes: a plurality of surface sensors located across the entire surface of the spherical television 1201; a barrier 1205; an amplified surface beam 1211; a source of electrons 1221, and a controller (not shown) for control of the source of electrons 1221. The Z coordinate 1231 is fixed at the barrier's edge 1205. A point 1235 is lit by electrical charge from the source of electrons 1221. The barrier 1205 is a negative charge field variable barrier. The sphere is a gas charged transparent vacuum.

Figure 13:
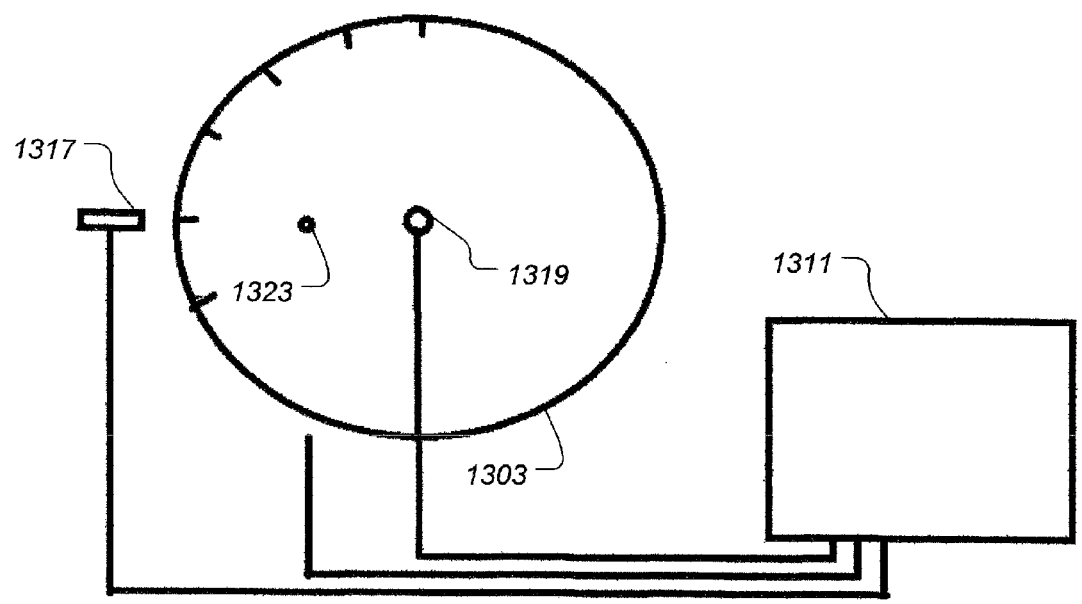
FIG. 13 is a sectional view of an alternative embodiment of a spherical television system according to the present application.

Referring now also to FIG. 13 in the drawings, a sectional view of an alternative embodiment of a spherical television system according to the present application is illustrated. Spherical television 1303 is a phosphorous gas display for use with color defined light tunnel sensors such as 1015. A laser distancing device 1311 is connected to a laser tunnel sensor 1317 and connected to a central composite receiving sensor 1319 located at the center of the gas filled transparent sphere. The laser distancing device generates the z-coordinate 1323 for the three dimensional 3 coordinate spherical television 1303.

Figure 14:
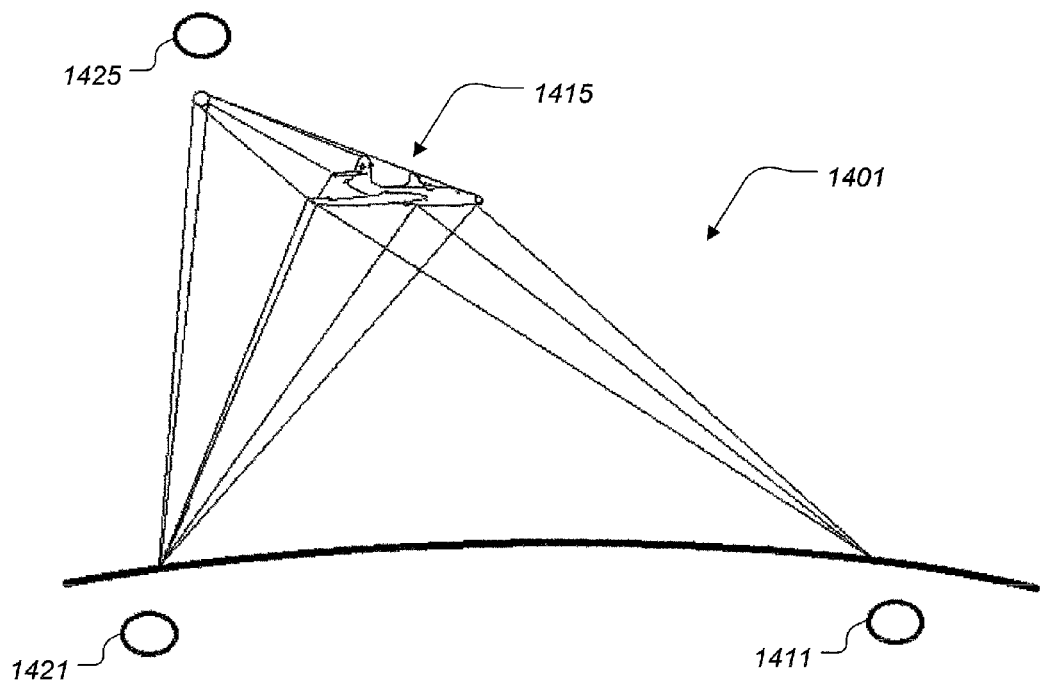
FIG. 14 is a sectional view of an alternative embodiment of a scanning system for a spherical television according to the present application.

Referring now also to FIG. 14 in the drawings, a sectional view of an alternative embodiment of a scanning system 1401 for a spherical television according to the present application is illustrated. Scanning system 1401 includes a plurality of imaging sensors, for example some on the ground and some in the sky to see both sides of an object such as a plane. Unit one 1411 includes a plurality of sensors to measure the reflected light off an object 1415. Unit two 1421 includes a plurality of sensors to measure the reflected light off a lower surface of the object 1415. Unit two 1421 preferably is located a distance away from unit one 1411. Unit three 1425 includes a reflective surface thereby enabling either unit one 1411 or unit two 1421 to measure the reflected light from an upper surface of the object 1415. Alternatively, unit three 1425 includes a plurality of sensors to measure the reflected light off the object 1415. Scanning system 1401 utilizes the position of the units to scan the object 1415 for display on the spherical television 81.

Figure 15:
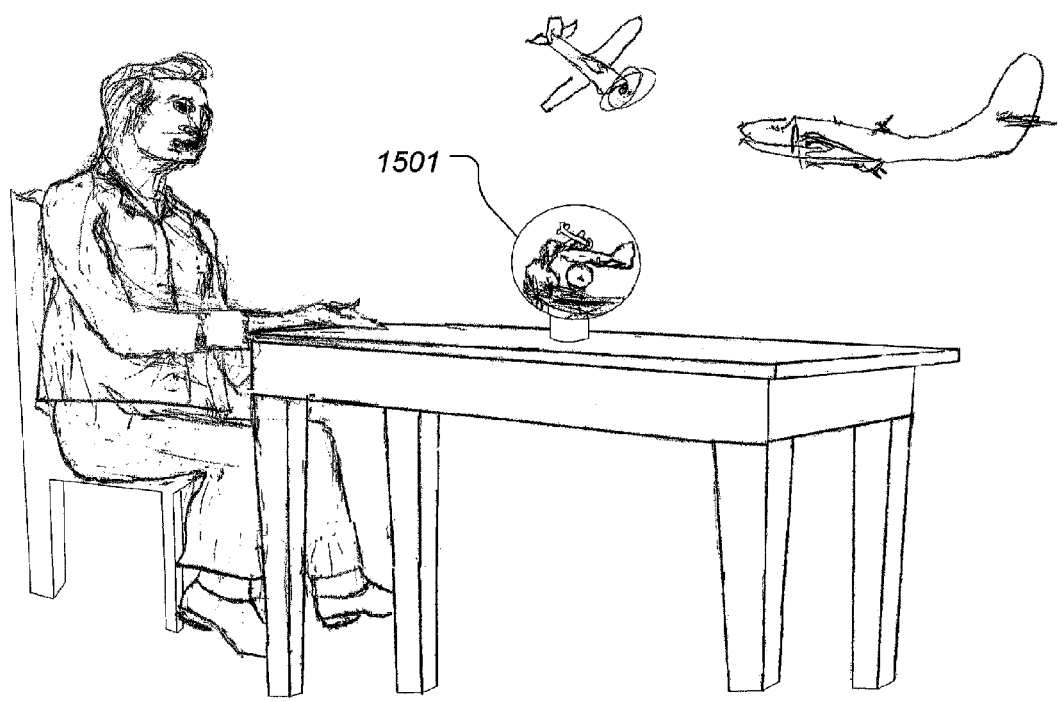
FIG. 15 is an isometric view of an alternative embodiment of a spherical television according to the present application.

Referring now also to FIG. 15 in the drawings, an isometric view of an alternative embodiment of a spherical television according to the present application is illustrated. Spherical television 1501 provides users with the ability to view the world around them on the spherical television 1501. It should be apparent that the person sitting at the table can see themselves and the airplanes in the spherical television 1501. It should also be apparent that as the user moves around the table the image on the spherical television 1501 would change to mirror the user's actions. It should be apparent that the distance from the person to the spherical television 1501 is proportional to the depth of the image of the person in the spherical television 1501.

Other embodiments utilize video recorders configured for storing images from spherical televisions to allow users to replay the events surrounding the spherical television 1501. Furthermore, with transmission system incorporated with the spherical television 1501, users can watch images from other spherical television from around the world.

Figure 16A:
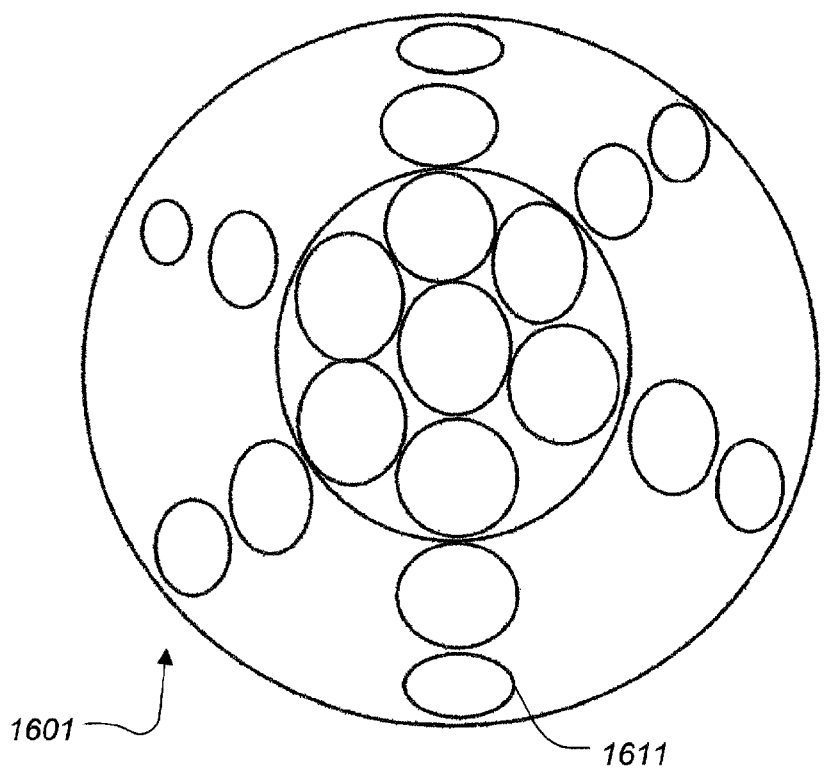
FIG. 16a is a side view of an alternative embodiment of a spherical television system according to the present application.

Referring now also to FIG. 16a in the drawings, a side view of an alternative embodiment of a spherical television system according to the present application is illustrated. Spherical television system 1601 includes a plurality of receptor panels 1611 in an array across the surface of the sphere. Alternatively, web cameras are used in place of the receptor panels 1611. The web cameras run continuously, be multiplexed, and recorded for display purposes. The visual information recorded from the web cameras is suitable for projecting upon curved walls for a totally panoramic view. With the use of tunnel vision sensors, a three-dimensional is possible. In this embodiment the image is shown on the surface of the sphere. For depth perception, multiple semitransparent display layers are utilized. System 1601 is an exception security camera and display system as there are no places where the cameras are not pointed.

Figure 16B:
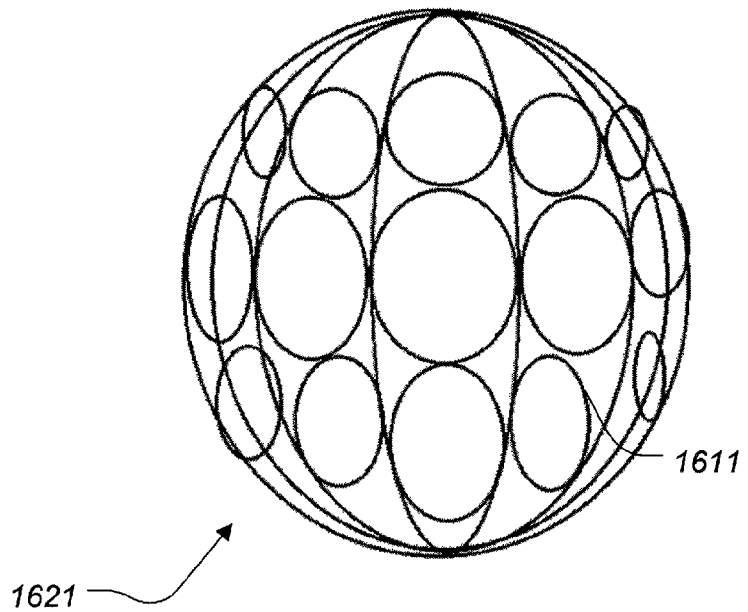
FIG. 16b is an isometric view of an alternative embodiment of a spherical television system according to the present application.

Referring now also to FIG. 16b in the drawings, an isometric view of an alternative embodiment of a spherical television system according to the present application is illustrated. Spherical television system 1621 includes a plurality of panels 1631 in an array across the surface of the sphere. The plurality of panels 1631 are of various sizes to facilitate covering the sphere.

Figure 17:
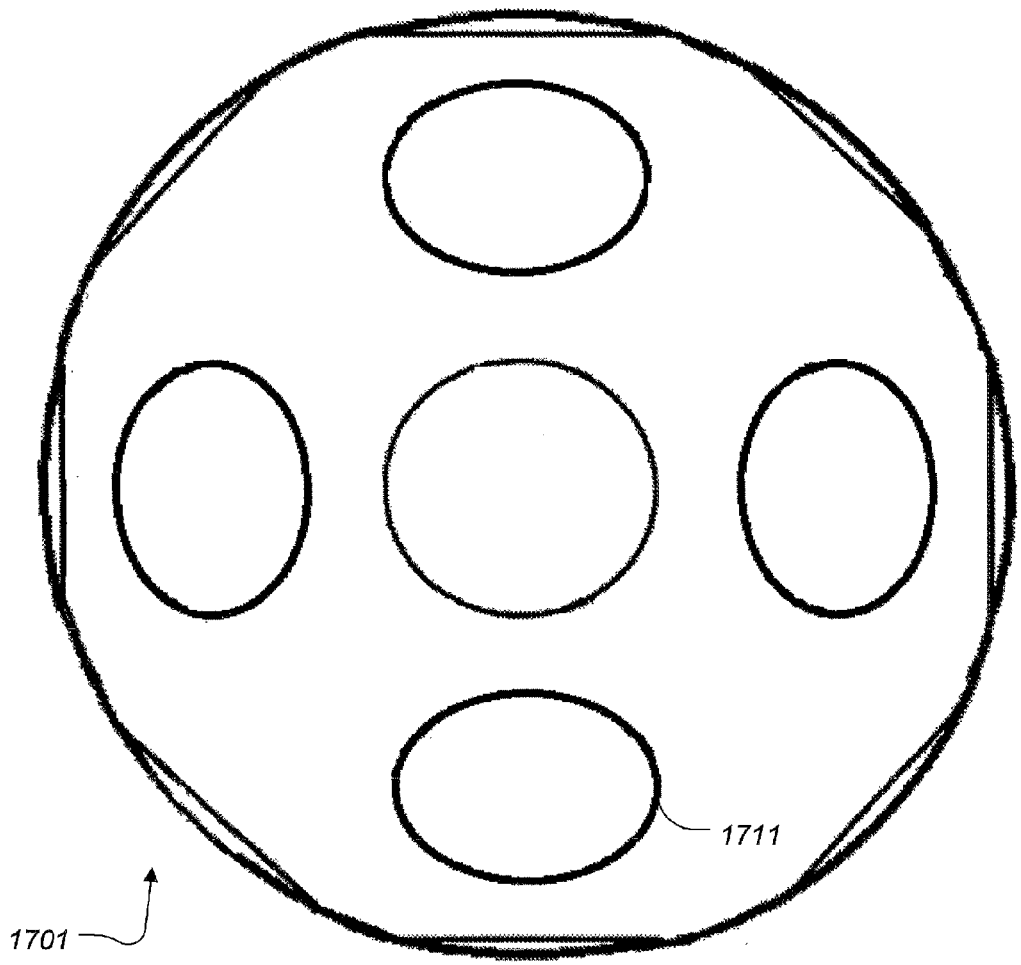
FIG. 17 is an isometric view of an embodiment of a spherosonic sound system according to the present application.

Referring now also to FIG. 17 in the drawings, an isometric view of an embodiment of a spherosonic sound system according to the present application is illustrated. Spherosonic sound system is configured to match the action from the spherical television 81 and includes speakers 1711 arrayed across the surface of the sphere.

Figure 18:
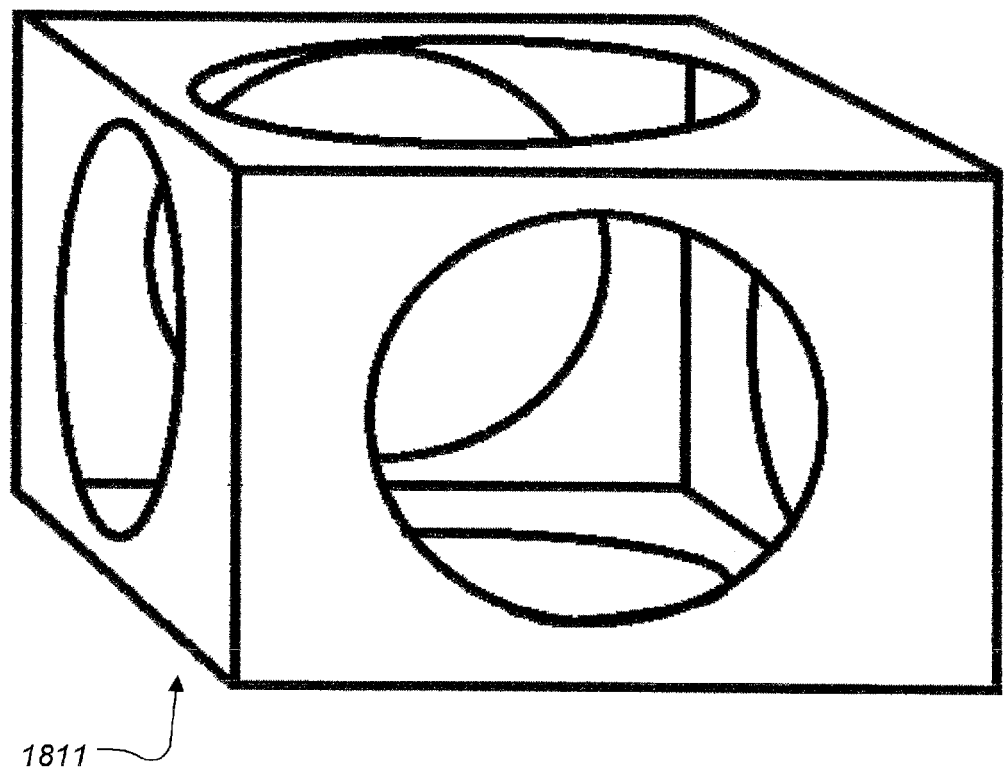
FIG. 18 is an isometric view of an embodiment of a cubophonic sound system according to the present application.

Referring now also to FIG. 18 in the drawings, an isometric view of an embodiment of a cubophonic sound system according to the present application is illustrated. Cubophonic sound system 1811 is configured to match the action from the spherical television 81 and includes speakers (not shown) arrayed across the surface of the cube. Multiple speakers may be added for total environmental coverage. Sounds from high in sky to deep under ground.

Figure 19:
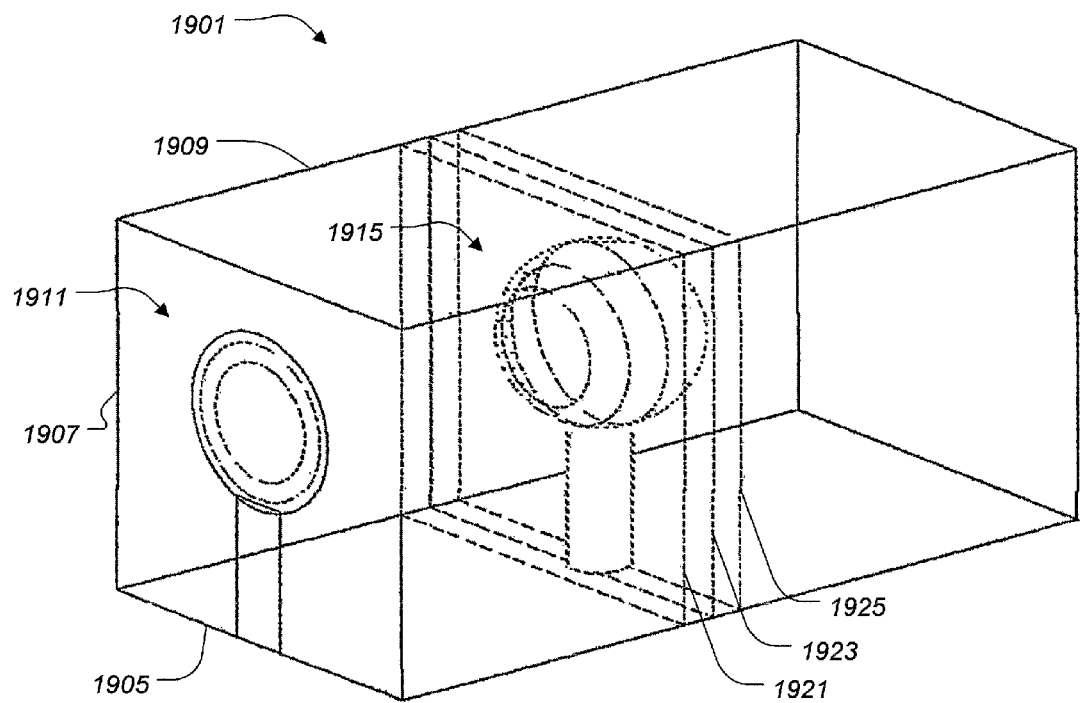
FIG. 19 is an isometric view of an embodiment of a cube based 3-D television according to the present application.

Referring now also to FIG. 19 in the drawings, an isometric view of an embodiment of a cube based 3-D television according to the present application is illustrated. System 1901 is similar to spherical television 81 however they have different shapes as evident in the illustrations. System 1901 includes a X coordinate system 1905, a Y coordinate system 1907, and a Z coordinate 1909. A standard television image 1911 as shown where Z=0 can be made into a three dimensional image 1915 with the addition of virtual distance planes or layers at different Z coordinates. The image of part of a tree top at Z coordinate plane A 1921, along with image of part of a tree top at Z coordinate plane B 1923, and image of part of a tree top at Z coordinate plane C 1925 combine to form the three dimensional image of tree 1915. Color and value extend to the distance planes and in depth create a total 3-D image. While only three planes have been shown, it should be apparent that the more layers used, the better the image quality of the three dimensional object.

Figure 20:
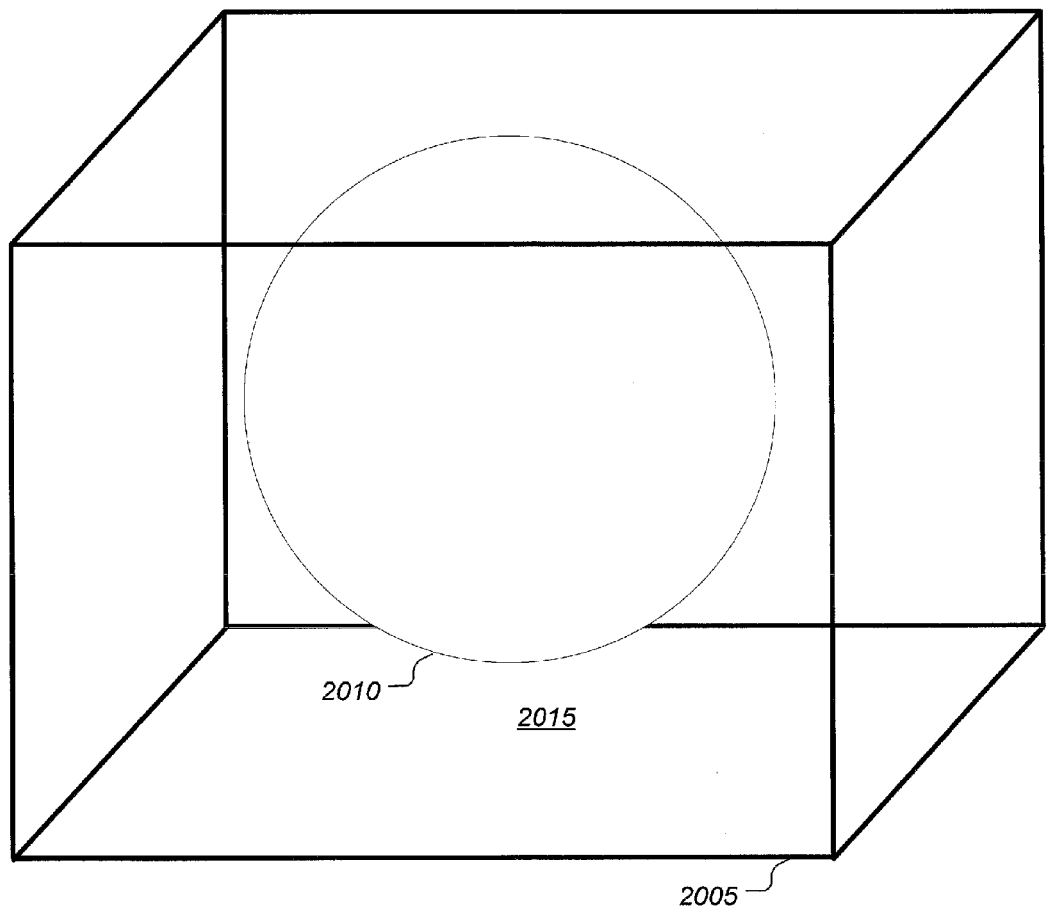
FIG. 20 an isometric view of an embodiment of a theater display having a large scale spherical television according to the present application.

Referring now also to FIG. 20 in the drawings, an isometric view of an embodiment of a theater display having a large scale spherical television according to the present application is illustrated. While spherical televisions such as spherical television 1501 are shown as table top sized, it should be apparent that the diameter of the spherical television could be increased such that it suitable for a crowd of individuals to watch the display. A theater 2005 includes a large diameter spherical television 2010 located in the interior of the theater 2005. The large diameter spherical television is preferably suspended from the ceiling such that the crowd can sit, on a floor area 2015, underneath it and watch it looking upwards. The Cubophonic sound system 1811 is suitable for use in conjunction with theater 2005.

Figure 21A:
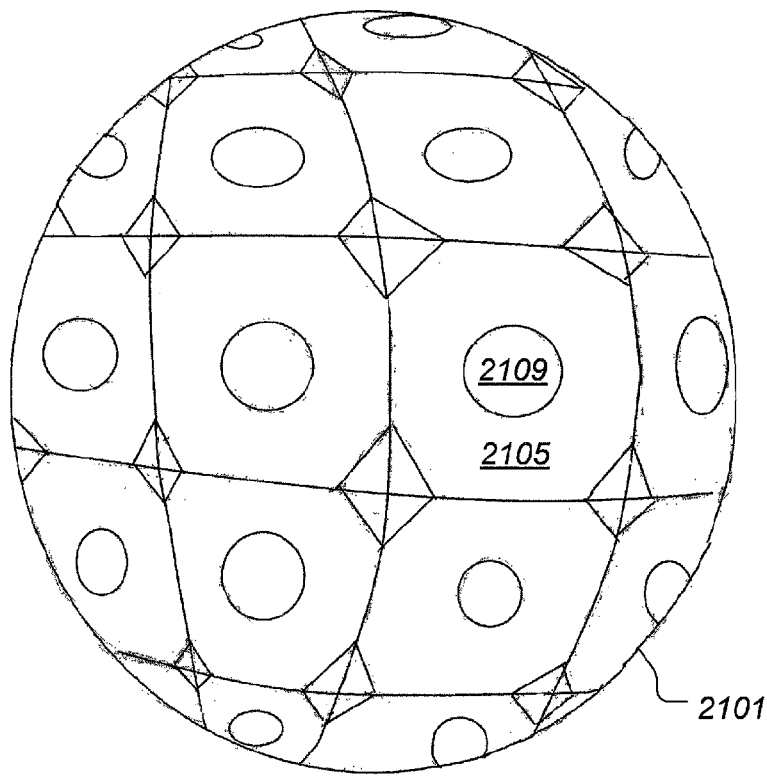
FIG. 21a is an isometric view of an embodiment of a spherical television according to the present application.

Referring now also to FIG. 21a in the drawings, an isometric view of an embodiment of a spherical television according to the present application is illustrated. Spherical television 2101, while similar to spherical television 1105, is comprised of rows of eight sided panel 2105 with lens located on the eight sided panel 2109. Wiring spherical television 2101 allows the panels 2105 to be multiplexed and connected in a systematic way to a controller. Alternatively this embodiment has a first sphere for imaging and a second sphere for display, for use like a security camera.

Figure 21B:
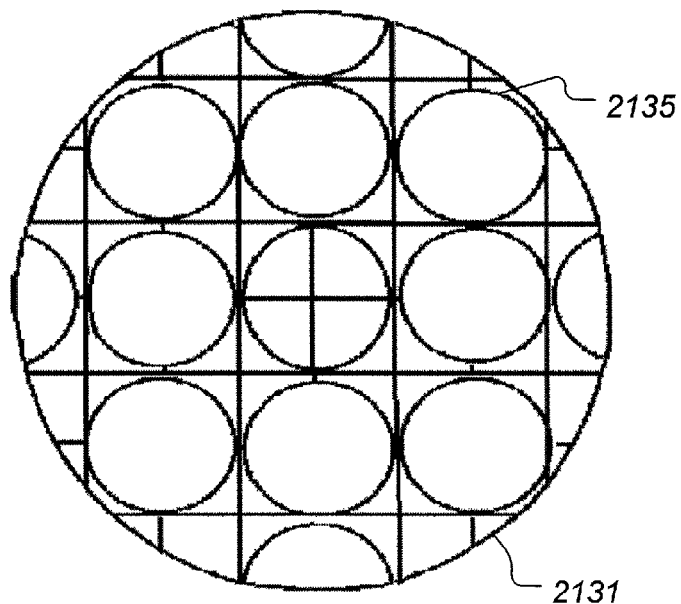
FIG. 21b is an isometric view of an embodiment of a spherical television according to the present application.

Referring now also to FIG. 21b in the drawings, an isometric view of an embodiment of a spherical television according to the present application is illustrated. Spherical television 2131 includes circular shaped cameras or display panels 2135.

Figure 22:
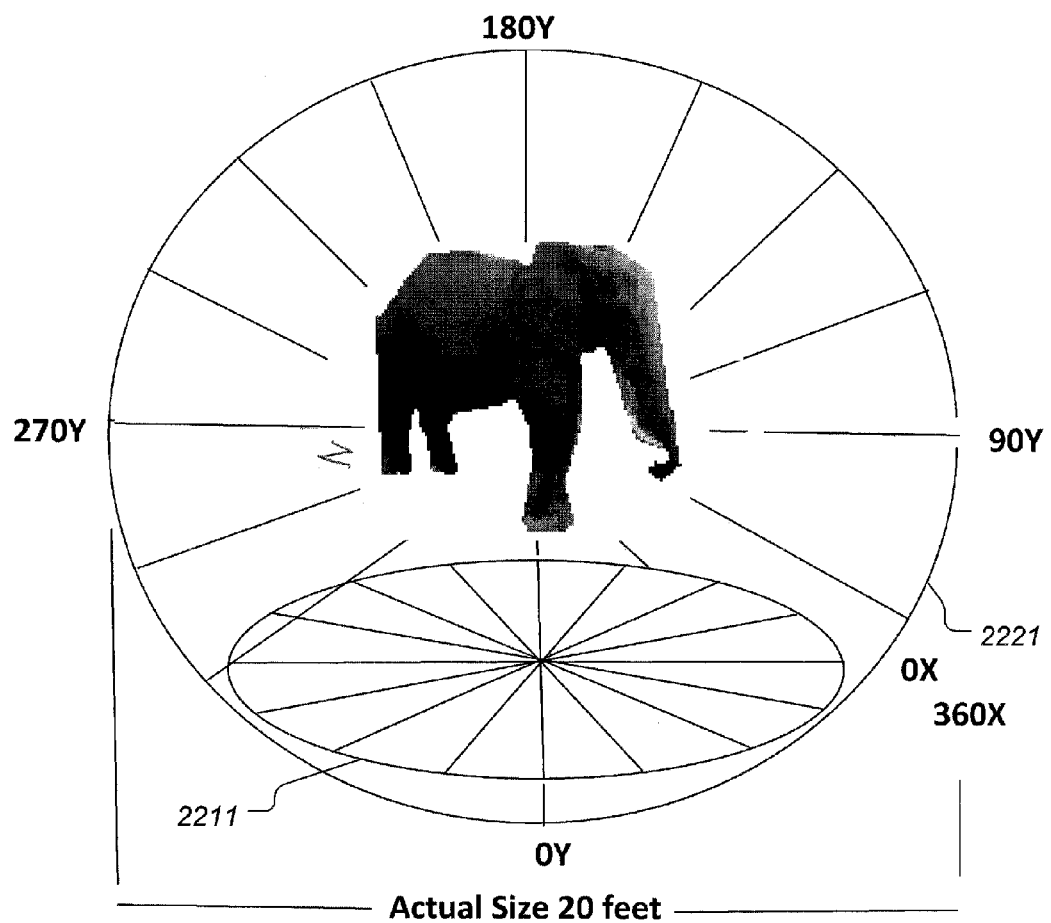
FIG. 22 is a plan view of a coordinate system of a spherical television according to the present application.

Referring now also to FIG. 22 in the drawings, a plan view of a coordinate system of a spherical television according to the present application is illustrated. Using an imaging system looking inwards allows for large objects to be imaged or viewed by the system. There is an X coordinate arrangement 2211 with a range of zero to 360 degrees. There is a Y coordinate arrangement 2221 with a range of zero to 360 degrees. There is a Z coordinate arrangement with a range of zero to the diameter of the imaging sphere. As shown in FIG. 22, the diameter of the imaging sphere is approximately 20 feet.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:
1. A spherical television system, comprising:
  a spherical shaped display, comprising;
    a plurality of display elements arrayed across a first spherical layer;
    a plurality of display elements arrayed across a second spherical layer; and a plurality of display elements arrayed across a third spherical layer; and a base for supporting the display.

2. The spherical television system according to claim 1, the display comprising:

a plurality of display elements;

wherein the plurality of display elements are arranged in a series of vertical sections around the display.

3. The spherical television system according to claim 2, wherein the series of vertical sections are arranged in layers; and wherein the layers are translucent.

4. The spherical television system according to claim 1, the display comprising:

a disk having a linear series of display elements;

wherein the disk rotates about two axes.

5. The spherical television system according to claim 1, the display comprising:

a plurality of light tubes groups arrayed around the display; and a display element located with each light tube group;

wherein the light tube groups are for measuring light.

6. The spherical television system according to claim 5, the plurality of light tube groups comprise:

a red light tube;

a green light tube; and a blue light tube.

7. The spherical television system according to claim 5, the plurality of light tube groups further comprise:

a laser pointed outwardly for measuring distance from a surface of the display.

8. The spherical television system according to claim 1, the display comprising:

an array of hexagon shaped display elements.

9. The spherical television system according to claim 8, further comprising:

an array of cameras facing outward.

10. The spherical television system according to claim 1, further comprising:

a scanning system, having;

a first imaging sensor;

a second imaging sensor; and a third imaging sensor;

wherein the first imaging sensor and the second imaging system are located at similar heights; and wherein the third imaging sensor is located above the first and second imaging sensor;

wherein light measured from the imaging sensors is displayed on the display; and wherein the scanning system is located external to the spherical display.

11. The spherical television system according to claim 1, further comprising:

a plurality of light sensors for measuring light, the light sensors pointed outwardly from a surface of the display;

wherein the display reproduces the measured light from the light sensors.

12. The spherical television system according to claim 1, further comprising:

a polarizing filter located on a surface of the display.

13. The spherical television system according to claim 1, further comprising:

a spherical shaped recorder;

wherein the recorder produces content for the display.

\* \* \* \* \*